Patented Aug. 14, 1934

1,970,306

UNITED STATES PATENT OFFICE 1,970,306

BAKING AGENT AND PROCESS OF IMPROVING DOUGH

Bernhard Hanack and Erich Mertens, Berlin, Germany

No Drawing. Application August 6, 1931, Serial No. 555,642. In Germany July 20, 1929

2 Claims. (Cl. 99—10)

Our invention relates to a baking agent and a process of improving dough. The baking agent according to our invention is rich in bacteria and may be used with advantage as an admixture to the sour dough or yeast-dough to regulate and expedite fermentation.

The process of improving dough according to our invention is carried out in such a manner that milk is caused to ferment with acid generating bacteria and thereupon added in certain proportion to the sour or yeast dough. In order to expedite the coherence of the dough a proper quantity of opened flour may be added to the baking agent.

Instead of liquid fermented milk there may also be taken dry milk which contains bacteria able to generate acid and a dry mixture may so be obtained which may now be worked with the sour dough or yeast dough by kneading. A mixture of this kind would, for instance consist of dry milk containing lactic acid, or of yeast, maize flour, powdered albumen, nutritious salts, dry powders of yoghurt or kefir, opened flour able to expedite coherence and of vitamins from sterilized cereals.

By our invention there is produced a baking agent of an especial kind and effect, said agent not only regulating and expediting fermentation but also essentially increasing the coherence of the dough by reason of some of the constituents, for instance, malt flour and opened flour, of which its mixture rich in diastase is composed.

Furthermore, by a special process of fermentation of the acid generating bacteria which are added in a proper quantity to the sour dough or to the yeast dough the injurious bacteria will be retained and their development suppressed, while the development of the good fermenting bacteria will be expedited.

Bread baked with the new baking agent according to our invention, is of bright and clear appearance, even if worked up with flour of poorer quality, and has the property of well baking though uniformly, at the same time being of loose and elastical structure. Moreover, by our new baking agent the volume and yield of the bread may be increased and in addition to this, the bread will be improved as regards its ability of being cut and chewed. Bread so baked is furthermore mild and of good taste and will keep fresh for some considerably longer time than bread produced in the ordinary manner.

Our new baking agent furthermore prevents excessive souring of the dough as well as the formation of ruptures and gaps in the bread and in addition affords protection against moulding, even in case of a bread from full corn (such as "pumpernickel"). Our new preparation will also prevent formation of threads.

The process according to our invention may be carried out, for instance, in the following manner:

Whole or skim milk is sterilized by a process of "pasteurizing", the milk being heated to a temperature of not less than 85° C. for more than 2 minutes.

Thereupon the pasteurized milk is cooled down to about 45° C. and mixed in liquid condition with acid generating bacteria.

After about 2 hours the milk will be fermented and properly thickened by maintaining the temperature at about from 38° C. to 40° C.

Now the thickened fermented milk is cooled down to water temperature of about 10°-12° C. and after being kept cool for two hours stirred up into a cream-like mass.

Now for each 40 kg. of fermented milk 3 kg. of the following dry mixture are added under constant stirring and the whole worked up into a cream-like mass. The said mixture consists of the following ingredients:

(1) Yeast,
(2) Nutritious salts, (nutritious lime salts or the like),
(3) Vitamin flour from sterilized cereals,
(4) Powdered albumen (casein or the like),
(5) Dry powder of yoghurt or kefir,
(6) Malt flour,
(7) Opened flour,
(8) Dry powder containing lactic acid, for instance dry milk containing lactic acid.

The so made fermenting product is added to the fully sour dough, for instance 3 kg. of said product to each 100 kg. of flour. This holds true for rye-bread, mixed bread made from a mixture of rye and wheat, shredded bread and heavy bread made from full corn.

Making up and baking the dough is performed in the ordinary manner.

The process may, for instance, also be carried out in such a manner that pasteurized milk is cooled down to about 42° C., mixed with 3 kg. of dry mixture and caused to undergo fermentation. The so obtained preparation is now added to the fully sour dough.

When making white rolls, phosphate of calcium, a known driving or swelling agent is added to the piece of yeast. In case of 100 kg. of dough for wheat-bread there are added to the piece of yeast about from 3-4 kg. of fermented milk yeast.

The new baking agent may also be used without the basic substance in the form of milk fermented with acid generating bacteria by merely adding the remaining ingredients of the dry mixture, viz: dry milk containing lactic acid, dry yeast, nutritious salts, vitamin flour, powdered albumen, powdered yoghurt and kefir and opened flour able to expedite the coherence of the dough, in certain proportions to the sour or yeast dough.

It is further preferable when working the dough to use any known substances such as malt-extract, glucose, honey or substances of equivalent effect in connection with the prescribed product of mixture, to still further expedite fermentation and improve the quality of the dough.

We claim:

1. A process for regulating and improving leaven and yeast-dough, comprising fermenting milk with acidulating bacteria, mixing the milk thus fermented with broken-up flour to increase and control the acidulating action of the bacteria, and adding the mixture so obtained to the leaven and the yeast-dough.

2. A process according to claim 1, comprising adding yeast, maltflour, extract of malt, glucose, syrup, honey, powdered albumen, nutritious salts, and vitaminous flour from germinated cereals thereto.

BERNHARD HANACK.
ERICH MERTENS.